(12) United States Patent
Hemminger et al.

(10) Patent No.: US 11,763,323 B2
(45) Date of Patent: Sep. 19, 2023

(54) SYSTEM AND METHOD FOR HANDBAG AUTHENTICATION

(71) Applicant: FASHIONPHILE Group, LLC, Carlsbad, CA (US)

(72) Inventors: Ben Hemminger, Carlsbad, CA (US); Sarah Davis, Carlsbad, CA (US)

(73) Assignee: FASHIONPHILE Group, LLC, Carlsbad, CA (US)

( * ) Notice: Subject to any disclaimer, the term of this patent is extended or adjusted under 35 U.S.C. 154(b) by 0 days.

(21) Appl. No.: 17/964,202

(22) Filed: Oct. 12, 2022

(65) Prior Publication Data

US 2023/0031983 A1 Feb. 2, 2023

Related U.S. Application Data

(63) Continuation of application No. 17/614,974, filed as application No. PCT/US2020/059122 on Nov. 5, 2020.

(60) Provisional application No. 62/931,470, filed on Nov. 6, 2019.

(51) Int. Cl.
*G06T 7/00* (2017.01)
*G06Q 30/018* (2023.01)
*G06N 3/04* (2023.01)

(52) U.S. Cl.
CPC .......... *G06Q 30/0185* (2013.01); *G06N 3/04* (2013.01); *G06T 7/0002* (2013.01); *G06T 2207/10141* (2013.01); *G06T 2207/20084* (2013.01); *G06T 2207/30124* (2013.01)

(58) Field of Classification Search
CPC ................................ G06N 3/04; G06T 7/0002
See application file for complete search history.

(56) References Cited

U.S. PATENT DOCUMENTS 8,893,973 B2 * 11/2014 Shaffer ............ G06K 19/06178
235/487

* cited by examiner

*Primary Examiner* — Edward Park
(74) *Attorney, Agent, or Firm* — CP LAW GROUP PC; Cy Bates

(57) ABSTRACT

Systems and methods for authenticating handbags using a portable electronic device along with a bilinear convolutional neural network (CNN) model are described. One method includes using a portable electronic device comprising a camera, and a lens-accessory attached to the portable electronic device such that an optical feature of the lens-accessory is positioned in front of the camera. The portable electronic device acquires one or more pictures of a handbag and sends the one or more pictures to a bilinear CNN model via a network asset where an authenticity is determined. The systems and methods disclosed are capable of allowing the portable electronic device to be spaced apart from the handbag while acquiring pictures, and the lens-accessory can be between 10× and 50× magnification.

15 Claims, 9 Drawing Sheets

| Brand | Fabric | Authentic Images | Counterfeit Images |
|---|---|---|---|
| Louis Vuitton | Monogram | 8032 | 2008 |
| Louis Vuitton | DamierEbene | 12010 | 1928 |
| Chanel | Caviar | 12132 | 2121 |

FIG. 7

| Brand | Fabric | Authentic Images | Counterfeit Images |
|---|---|---|---|
| Louis Vuitton | Monogram | 8032 | 8032 |
| Louis Vuitton | DamierEbene | 12010 | 12010 |
| Chanel | Caviar | 12132 | 12132 |

FIG. 8

| Brand | Fabric | Authentic | Authentic Accuracy | Counterfeit | Counterfeit Accuracy |
|---|---|---|---|---|---|
| Louis Vuitton | Monogram | 562 | 98% | 242 | 100% |
| Louis Vuitton | DamierEbene | 761 | 99% | 343 | 100% |
| Chanel | Caviar | 653 | 99% | 321 | 100% |

FIG. 9

SYSTEM AND METHOD FOR HANDBAG AUTHENTICATION

TECHNICAL FIELD

This invention relates to the image analysis of handbags by classification with machine learning models; and more particularly, to handbag authentication using image analysis.

BACKGROUND ART

The luxury resale market has been increasing for many years due to consumer preferences putting an emphasis on sustainability and variety. With buying and selling of secondhand luxury goods comes an increase in counterfeiting, where a third party imitates a manufactures product with an intent to deceive and use in illegal transactions. Counterfeit goods are typically of inferior quality and can be hard to detect by an average consumer. Counterfeit goods, an already major problem, will only become worse as the luxury resale market continues to grow. This problem is especially prevalent in luxury handbags.

Many options have existed in the art for authentication and counterfeit identification, such as holograms, RFID tags, and barcodes. Recently, physical unclonable functions (PUF), which is a digital signature typically applied to authenticate semiconductors, have also been used to authenticate handbags.

SUMMARY OF INVENTION

Technical Problem

Handbag authentication requires a person with years of training to make visual determinations. In addition, one skilled to authenticate must continue to study new releases of authentic and counterfeit handbags, especially as the difference between the two continues to diminish. Even those considered to be experts still require time that can slow down the authentication process.

Current solutions such as holograms, RFID tags, and barcodes add a physical tag to the object. This process increases time and cost of the manufacturing process. Furthermore, the physical tag can be removed, forged, or even duplicated and used to counterfeit other goods. Even more state-of-the art solutions including PUFs can be expensive and have been harder to adopt both by handbag manufacturers and resellers.

Even solutions that utilize image-analysis from machine learning rely on custom hardware touching the handbag at a magnification greater than 100×. This can slow down the authentication process and prevent from performing in manner similar to a factory line automation.

Solution to Problem

The advancements of machine learning technology, and especially in the field of computer vision, have allowed computers, smartphones, and other devices to automatically perform actions that at one point was only capable of being performed by a human actor. One such process that can utilize computer vision for automatic classification is related to authenticating luxury goods such as handbags.

The invention is directed to a method, and related systems, for identifying counterfeit handbags. The method comprises a series of steps: using a portable electronic device comprising a camera, and a lens-accessory attached to the portable electronic device such that an optical feature of the lens-accessory is positioned in front of the camera: acquiring one or more pictures of a handbag, sending the one or more pictures to a network asset configured to execute a counterfeit-classifier model, the counterfeit-classifier model being a bilinear convolutional neural network (CNN) model trained from a plurality of stored images, comparing at least a portion of each of the one or more pictures with the plurality of stored images, and determining if the handbag is a counterfeit based on said comparing.

Advantageous Effects of Invention

The ability to automatically authenticate a handbag with off-the-shelf hardware would result in a more efficient process than that of the prior art and could allow for factory line automation. The number of transactions for the selling and reselling of handbags will continue to increase and can benefit from a more efficient authentication procedure.

A person with years of experience in authenticating handbags would no longer be required for such authentication, and the training of new employees would be greatly reduced.

When a lens-accessory on a portable electronic device is used conjunction with a bilinear convolutional neural network (CNN) model, an accurate image analysis model can be trained without requiring further custom hardware or inefficient techniques to acquire pictures.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 7 is a table of data before performing data augmentation;

FIG. 8 is a table of data after performing data augmentation; and

FIG. 9 is a table of accuracy results.

DETAILED DESCRIPTION

Figure 1:
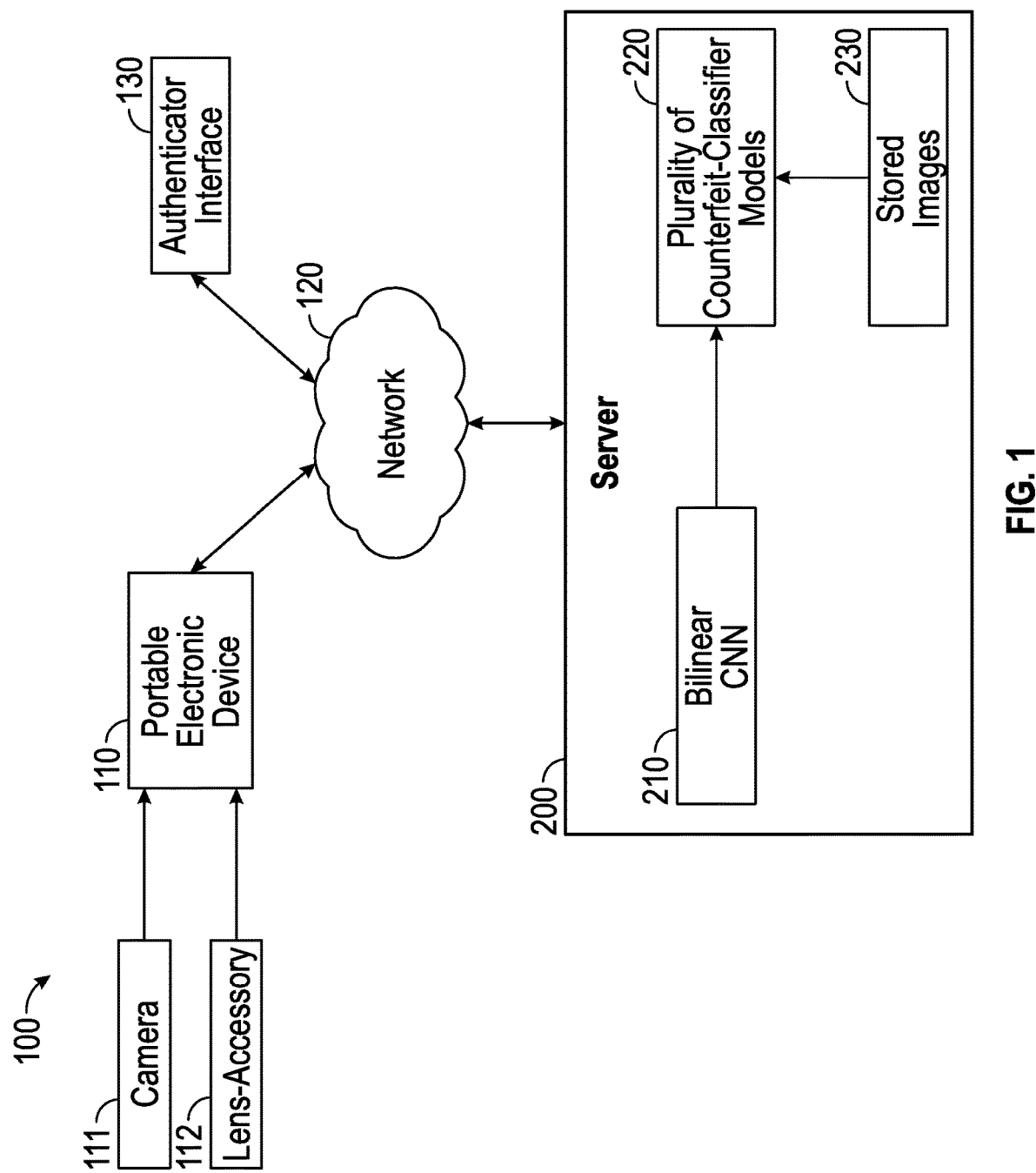
FIG. 1 is a system block diagram representation of an embodiment of a handbag authentication system.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, "portable electronic device" means a computing device such as a smartphone, a tablet, or any other device having computing functionality and data communication capabilities in a portable form factor;

"Lens-accessory" means an accessory configured to be attached to a portable electronic device having a camera, such that an optical feature of the lens-accessory is positioned in front of the camera. The camera and lens-accessory may combine to have a magnification between 10× and 50×;

"Counterfeit-classifier model" means a machine learning model trained to classify one or more images of a handbag as either authentic or counterfeit;

"Bilinear convolutional neural network (CNN)" means an image classification model where an image is processed through two feature extractors utilizing different CNN architecture convolutional steps, combined by a multiplication of an outer product and fed into a classifier;

"Stored images" means a images/pictures of handbags stored on a network;

"Authentic-identifying features" means features from one or more pictures of a handbag useful to authenticate a brand and/or style of a handbag, such features may include bumps, wrinkles, stitching, creases, color, or any other unique fabric characteristics that can be seen in a magnified image;

"Stored-image features" means features from stored images of handbags with a known brand and/or style, such features may include bumps, wrinkles, stitching, creases, color, or any other unique fabric characteristics that can be seen in a magnified image;

"Outer product" means a linear algebra mathematical procedure wherein the outer product of two vectors is a matrix. If two vectors have dimensions n and m respectively, then their outer product is an n×m matrix. An outer product of two multidimensional arrays of numbers is a tensor;

"Style" means a subclass of a brand, where a style can have distinct characteristics such as fabric, size, and shape that distinguishes the style from other styles. Multiple styles may have a common fabric.

While this disclosure is illustrative of a method and system for authenticating handbags, the method and system can be similarly adapted to other fashion items, such as shoes, jewelry, clothing, and the like.

In a first embodiment a method of identifying counterfeit handbags is disclosed. The method comprises the steps of using a portable electronic device comprising a camera. A lens-accessory is attached to the portable electronic device such that an optical feature of the lens-accessory is positioned in front of the camera. The portable electronic device acquires one or more pictures of a handbag, sending the one or more pictures to a network asset configured to execute a counterfeit-classifier model. The counterfeit-classifier model is a bilinear convolutional neural network (CNN) model trained from a plurality of stored images. Then, at least a portion of each of the one or more pictures is compared with the plurality of stored images. The counterfeit-classifier model determines if the handbag is a counterfeit based on said comparing.

In some embodiments, the portable electronic device is spaced apart from the handbag during said acquiring of the one or more pictures of the handbag.

In some embodiments, the optical feature of the lens-accessory may comprise a magnification of between 10× and 50×.

In some embodiments, said comparing the at least a portion of the one or more pictures with the plurality of stored images comprises: for each of the one or more pictures, extracting a plurality of authentic-identifying features from the handbag for each of the one or more pictures. The plurality of authentic identifying features is then compared with a plurality of stored-image features from each of the plurality of stored images.

Generally, the one or more pictures are each processed through a first feature extractor generating a first output, a second feature extractor generating a second output. The first and second output are subsequently multiplied together by an outer product multiplication.

In some embodiments, the training of the bilinear CNN model comprises a first feature extractor generating a plurality of first outputs from the plurality of stored images, and a second feature extractor generating a plurality of second outputs from the plurality of stored images. An outer product multiplication is then calculated wherein the plurality of the first outputs is multiplied respectively with the plurality of the second outputs using an outer product mathematical operation.

In the first embodiment, the first feature extractor and the second feature extractor may each be executed on a common set of initial features.

In a second embodiment, a system is disclosed. The system comprises a portable electronic device, including: a camera, a processor, and a non-transitory computer-readable medium. A lens-accessory is configured to couple with the portable electronic device. The lens-accessory includes an optical feature configured for positioning in front of the camera of the portable electronic device. The non-transitory computer-readable medium of the portable electronic device is configured to store instructions that when executed by the processor cause the processor to perform steps comprising: acquiring one or more pictures of a handbag, sending the one or more pictures to a network asset configured to execute a counterfeit-classifier model, the counterfeit-classifier model being a bilinear convolutional neural network (CNN) model trained from a plurality of stored images, comparing at least a portion of each of the one or more pictures with the plurality of stored images, and determining if the handbag is a counterfeit based on said comparing.

In the second embodiment, the optical feature of the lens-accessory may comprise a magnification of between 10× and 50×.

In some embodiments, the comparing the at least a portion of the one or more pictures with the plurality of stored images includes, for each of the one or more pictures, extracting a plurality of authentic-identifying features from the handbag contained therein, and comparing the plurality of authentic-identifying features with a plurality of stored-image features from each of the plurality of stored images.

Generally, the one or more pictures are each processed through a first feature extractor and a second feature extractor in parallel. Both the first and second feature extractors generate a first output and a second output respectively. The first and second outputs are multiplied together using an outer product.

In some embodiments, the training of the bilinear CNN model comprises a first feature extractor generating a plurality of first outputs from the plurality of stored images. The training of the bilinear CNN model further comprises a second feature extractor generating a plurality of second outputs from the plurality of stored images. Subsequently, an outer product multiplication is determined wherein the plurality of the first outputs is multiplied respectively with the plurality of the second outputs.

In the second embodiment, the first feature extractor and the second feature extractor may each be executed on a common set of initial features.

In a third embodiment, a non-transitory computer-readable medium configured to store instructions is disclosed. The instructions, when executed by one or more computers, cause the one or more computers to perform operations comprising: acquiring one or more pictures of a handbag, sending the one or more pictures to a network asset configured to execute a counterfeit-classifier model, the counterfeit-classifier model being a bilinear convolutional neural network (CNN) model trained from a plurality of stored images, comparing at least a portion of each of the one or more pictures with the plurality of stored images, and determining if the handbag is a counterfeit based on said comparing.

In some embodiments, said comparing the at least a portion of the one or more pictures with the plurality of stored images comprises: for each of the one or more pictures, extracting a plurality of authentic-identifying features from the handbag contained in each of the one or more pictures, and comparing the plurality of authentic-identifying features with a plurality of stored-image features from each of the plurality of stored images.

Generally, the one or more pictures are each processed through a first feature extractor generating a first output, a second feature extractor generating a second output. An outer product is calculated by multiplying the first and second outputs using an outer product operation.

In some embodiments, the training of the bilinear CNN model includes generating a plurality of first outputs from the plurality of stored images utilizing a first feature extractor. Additionally, training of the bilinear CNN model includes generating a plurality of second outputs from the plurality of stored images utilizing a second feature extractor. Once the plurality of first and second outputs are generated, the first and second outputs are combined by an outer product operation. The outer product operation must be respective, meaning only a first and second output from a common picture should be combined.

In the third embodiment, the first feature extractor and the second feature extractor may each be executed on a common set of initial features.

Now to the drawings, FIG. 1 shows an embodiment of a system block diagram (100). The system comprises a portable electronic device (110), an authenticator interface (130), a network (120), and a server (200). The portable electronic device includes a camera (111), and attached to the portable electronic device is a lens-accessory (112). The portable electronic device, in conjunction with the camera and lens-accessory, acquires one or more pictures of a handbag. The one or more pictures are sent to a server (200) via a network (120). The one or more pictures are each processed through a bilinear CNN (210) and subsequently sent to at least one of a plurality of counterfeit-classifier models (220). Each counterfeit-classifier model from the plurality of counterfeit-classifier models is trained from a plurality of stored images (230). After a determination is made if whether the handbag is authentic or counterfeit, predictions are sent to the authenticator display via the network.

The authenticator interface (130) can be on any device including the portable electronic device (110) or a device operated by a third party. The portable electronic device may be operated by a buyer interested in purchasing the handbag, or alternatively by a seller interested in selling their second-hand handbag. In one embodiment, the buyer physically receives the handbag and uses the portable electronic device to acquire pictures to determine if the handbag is authentic before finalizing the purchase. In another embodiment, the seller uses the portable electronic device to upload one or more pictures of the handbag to the server (200) to identify the handbag's authenticity. In this embodiment, the authenticator interface would be on a device operated by the buyer.

The portable electronic device (110) is a portable computing device such as a smartphone, tablet, portable computer, or any other device having computing functionality and data communication capabilities. The lens-accessory (112) may include any commercially available magnification lens capable of magnifying an image. such as OlloClip Macro 21× Super-Fine Pro Lens (https://www.olloclip.com/products/connect-x-macro-21x-pro-lens). Preferably, the magnification would be between 10× and 50×. Alternatively, the lens-accessory can be customized in accordance with the level of knowledge of one having skill in the art.

The one or more pictures may be sent from the portable electronic device (110) to the network (120) by an application programming interface (API) which is downloaded to the portable electronic device. The bilinear CNN (210) and the plurality of counterfeit-classifier models (220) can each be powered with graphic processing units (GPUs) while being deployed on the server (200). The API can include the authenticator interface (130), and in addition may provide instructions on a number of pictures required along with preferred distance between the portable electronic device and the handbag. Generally, distances of about six to about twelve inches may be preferred. If a secondary classifier model is created and trained to classify acceptable pictures, then acceptable pictures can be automatically determined, and feedback can be given if an insufficient number of acceptable pictures are provided.

The bilinear CNN (210) comprises a set of processes to extract features from the one or more pictures prior to sending to at least one from the plurality of counterfeit-classifier models. The set of processes include extracting features with two feature extractors, sum-pooling, and outer product. Further discussion of the bilinear CNN can be found in FIG. 2.

At least one counterfeit-classifier model from the plurality of counterfeit-classifier models (220) receives features from an output of the bilinear CNN (210), including extracted features, and processes the features through a classifier to make a prediction. The prediction is whether the handbag is authentic or counterfeit. The plurality of counterfeit-classifier models is trained from a plurality of stored images (230). Preferably, each trained model from the plurality of counterfeit-classifier models is trained on one type of fabric. For example, Monogram is a fabric used by Louis Vuitton on over one-hundred different styles of handbags. If a fabric used has common features among different styles of handbags, then stored images comprising the fabric can be consolidated and used to train a model. The model is then capable to infer if a particular fabric from a picture is a counterfeit or is genuine.

In one embodiment, characteristics of the handbag are identified prior to authentic classification. Based on identified characteristics, such as brand/style or fabric, the one or more pictures can be sent to a correctly trained model. The correctly trained model is trained from stored images comprising fabric common to the identified characteristics.

Determination of the characteristics can be performed automatically by a handbag classifier trained for identifying handbag characteristics. Alternatively, the determination of characteristics can be performed manually by someone having skill in the art and subsequently inputting the characteristics into the API of the portable electronic device (110). In another embodiment, the handbag characteristics are ignored and instead the one or more pictures are classified by each of the plurality of counterfeit-classifier models, whereby models which output a classification below a preset probability are disregarded and only a counterfeit-classifier model that produces a prediction above the preset probability is selected.

Alterative to having a plurality of counterfeit-classifier models, a multi-class model can be trained on a plurality of fabrics to make a prediction of authenticity. The multi-class model would comprise a plurality of classifications, each classification comprising a fabric type and either an authentic or counterfeit label.

Figure 2:
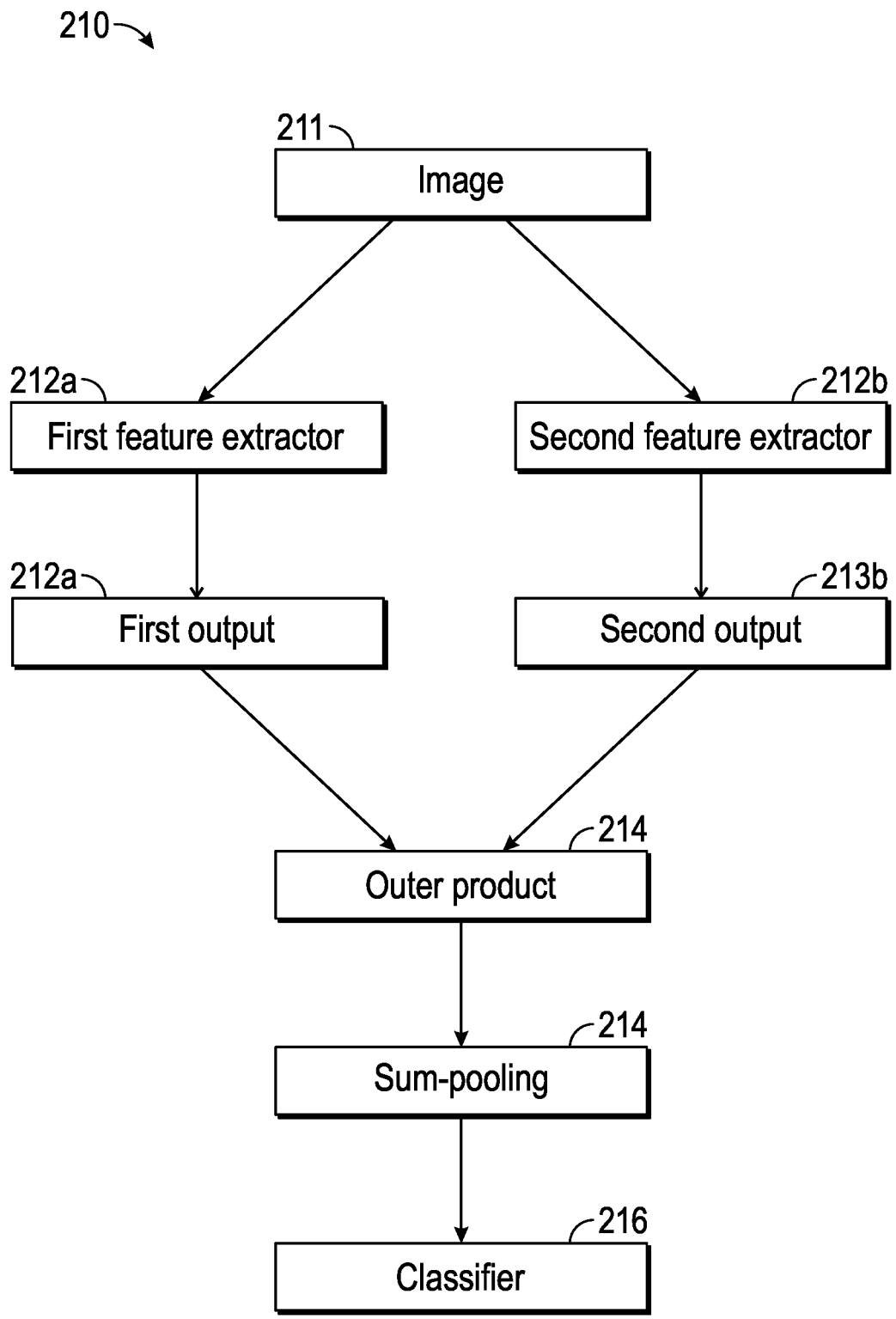
FIG. 2 is a flow chart representation of a bilinear CNN model.

Referring to FIG. 2, a flow chart representation of a bilinear CNN model (210) is shown. In the model, an image (211) is fed into a first feature extractor (212a) and a second feature extractor (212b). The first and second feature extractors can each be one of a variety of CNN architecture models truncated at a convolutional layer of the respective CNN architecture model. Examples include M-Net comprising 14 layers of convolution, and D-Net comprising 30 layers of convolution. After an image is processed through the first and second feature extractors, a first output (213a) and second output (213b) are respectively created. The first and second outputs and then multiplied together by an outer product (214), after which, sum-pooling (215) is then executed to aggregate bilinear features across the image, resulting in a bilinear vector. The bilinear vector is then fed in a classifier (216).

The classifier (216) can either be a linear classifier or nonlinear classifier. Linear classifiers include support vector machines (SVM), logistic regression, or perceptron. Nonlinear classifiers include k-nearest neighbors (kNN) and kernel SVM. Logistic regression can be advantageous due to outputting a probability of a maximum likelihood estimation. However, it can be appreciated that alternative classifiers can also be used, and may also comprise a plurality of fully-connected layers.

Figure 3:
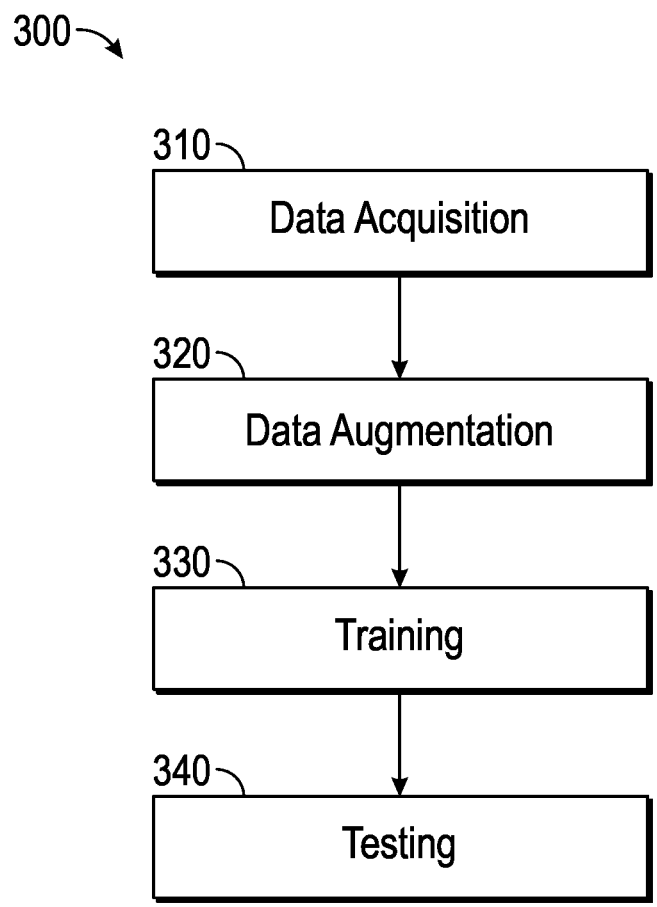
FIG. 3 is a flow chart representation of a method of building a counterfeit-classifier model for authenticating handbags.

Referring to FIG. 3, a flow chart representation of a method of building a counterfeit-classifier model (300) for authenticating handbags is shown. The method of building a counterfeit-classifier model comprises the steps data acquisition (310), data augmentation (320), training (330), and testing (340).

Data acquisition (310) may be conducted by human curators. Each of the human curators can use portable electronic devices to collect pictures from both authentic handbags and counterfeit handbags. Each of the portable electronic devices are capable of acquiring pictures with magnification up to 50×. It is preferred if each of the portable electronic devices were similar in performance to provide consistency of pictures acquired. When acquiring pictures from a handbag with a particular fabric, multiple images should be captured of various parts the particular fabric. Given the possibility of having a limited number of counterfeit handbags, it is important to ensure that there is a sufficient number of counterfeit handbags saved for testing after training is performed. As for the authentic handbags, a similar number can be set aside for testing, or alternatively, newly arrived handbags from the handbag's manufacture may be used.

As has been described already, a fabric that is used on multiple handbag styles can be consolidated as long as features of the fabric are common among the multiple handbag styles. Factors that should be considered include whether a common fabric is sourced for all related styles, and whether each handbag style undergoes similar pre- and post-processing manufacturing steps. Common features can be determined manually by one having skill in the art of counterfeit handbags by sampling fabrics of different styles and subsequently compared. Alternatively, handbag manufacturers can be contacted to confirm common fabric is used among different styles.

Data augmentation (320) may be needed to address class imbalance. The class imbalance, where data for counterfeit handbags is significantly outweighed by data for authentic handbags, can affect quality and reliability of results. Classifiers tend to become biased towards classifying authentic handbags and do not perform as well classifying counterfeit handbags. To rectify a class imbalance, pictures of counterfeit handbags can be augmented, or perturbed, to increase the data for counterfeit handbags. For each picture of a handbag fabric, which alternatively can be described as a training example, a random perturbation process is selected and applied the picture. The random perturbation process is performed with a uniformly random parameter set. For example, perturbation processes that may be considered include contrast, scaling, gaussian noise, and image rotation. A uniformly random parameter set of the perturbation process of image rotation could comprise −30 degrees, −20 degrees, −10 degrees, +10 degrees, +20 degrees, and +30 degrees. Data augmentation by perturbation is described more in FIG. 4.

Training (340) is conducted by a bilinear convolutional neural network (CNN) as described in FIG. 2. The bilinear CNN can model local pairwise feature interactions in a translationally invariant manner. Furthermore, the bilinear CNN can simplify gradient computation which allows end to end training of both first and second feature extractors using only labels of an image. CNN architectures used as the first and second feature extractors can be pre-trained on an image dataset, such as ImageNet, which is then subsequently followed by fine-tuning specific to handbags. Outputs of both the first and second feature extractors are multiplied using an outer product operation at each location of the image and pooled to obtain a bilinear vector. The bilinear vector is then passed through a classifier to obtain predictions. A preferable method of training a counterfeit-classifier model includes training a separate model for each fabric. Alternatively, a single model can be trained on all fabric types with only pictures of authentic bags. If a probability output from a softmax layer is below a threshold amount, then the handbag is classified as counterfeit. The single model approach is based on logic that a handbag that doesn't match closely with any of a plurality of authentic bags is predicted as a counterfeit.

Testing (340) is the step that proceeds training (330). Testing is performed with holdover data which was not used during testing. It can be advantageous that pictures used during training and testing each comprise a mixture of old and new to smooth out any procurement or manufacturing changes that inevitably can occur over time. To ensure counterfeit handbags are identified, a threshold of the softmax layer can be deliberately chosen to catch all counterfeits while misclassifying a small portion of authentic handbags.

Figure 4:
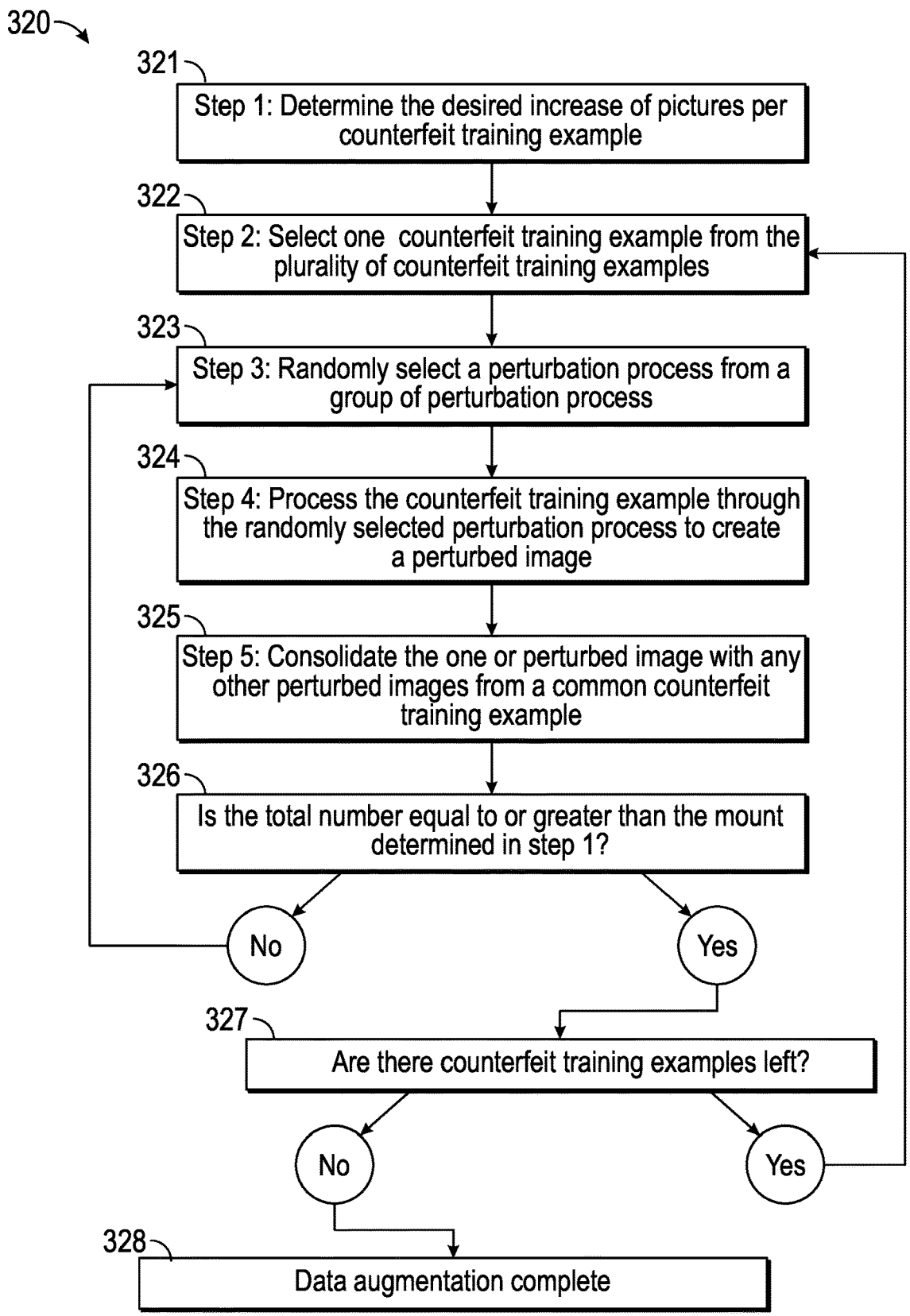
FIG. 4 is a flow chart representation of an example of a method of data augmentation.

Referring to FIG. 4, a flow chart representation of an example of a method of data augmentation (320) is shown. The method comprises the steps:

Step 1: Determine a desired increase per counterfeit training example (321). One example of a method to determine the desired increase is as follows: calculate a difference of a number of authentic and counterfeit training examples and divide by the number of counterfeit training examples. The method described herein will equalize the number of counterfeit training examples with the number of authentic training examples.

Step 2: Select one counterfeit training example from the plurality of counterfeit examples (322).

Step 3: Randomly select a perturbation process from a group of perturbation processes (323). Performing a selection randomly is used to prevent any bias from a particular perturbation process.

Step 4: Process the counterfeit training example through the randomly selected perturbation process to create a perturbed image (324).

Step 5: Consolidate the perturbed image with any previously perturbed images from a common counterfeit training example (325).

Once all perturbed images from a counterfeit training example are consolidated into a total number of perturbed images, the total number of perturbed images are compared to the desired increase determined in Step 1 (321). If the total number of perturbed images is less than the desired amount, the method returns to Step 3 (323) where another perturbation process is randomly selected and performed. If the total number of perturbed images is greater than or equal to the desired amount, then the training example is removed from the plurality of counterfeit training examples. An assessment of the plurality of counterfeit training examples is then conducted. If there are no counterfeit training examples remaining, then the data augmentation is complete. Otherwise, the method returns to Step 2 (322) where a new counterfeit training example is selected and processed similarly.

Alternative approaches can be made from the flowchart described in FIG. 4. They may include randomly selecting only one perturbation process once, and performing said perturbation process multiple times for a counterfeit training example. Another approach involves randomly selecting a plurality of perturbation processes for each counterfeit training example and performing each of the plurality of perturbation processes only one time.

Figure 5:
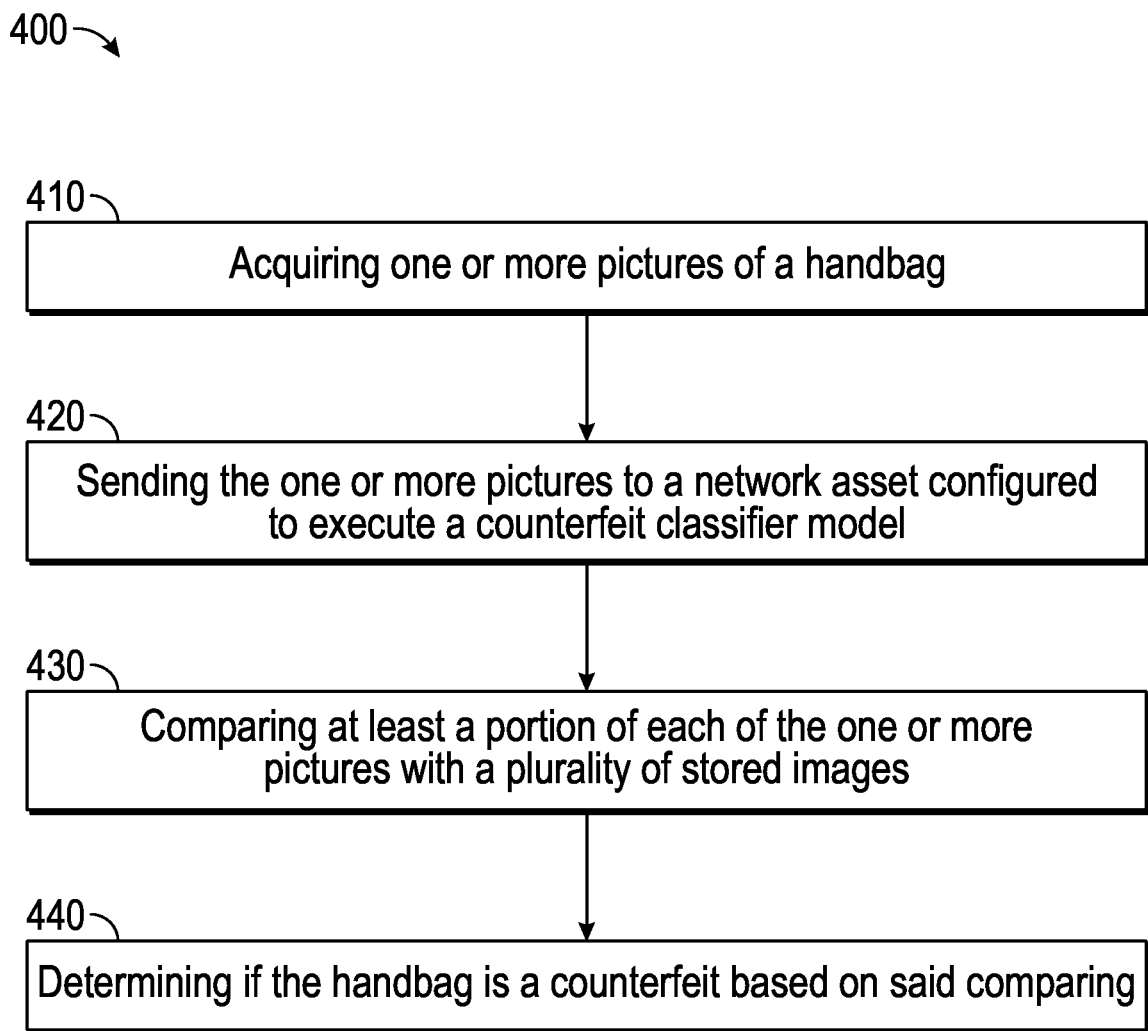
FIG. 5 is a flow chart illustrating a method for authenticating handbags.

Referring to FIG. 5, a flow chart illustrating a method for authenticating handbags (400) is shown. The method for authenticating handbags comprises the steps: acquiring one or more pictures of a handbag (410), sending the one or more pictures to a network asset configured to execute a counterfeit-classifier model (420), comparing at least a portion of each of the one or more pictures with a plurality of stored images (430), and determining if the handbag is a counterfeit based on said comparing (440).

The acquiring one or more pictures of a handbag (410) step comprises a portable electronic device having a camera, and a lens-accessory coupled to the portable electronic device. The lens-accessory may have a magnification level between 10× and 50×. The portable electronic device requires a distance from the handbag close enough such that the one or more pictures acquired embody features that will subsequently be fed in a bilinear CNN. Said features may include bumps, wrinkles, stitching, creases, color, or any other unique fabric characteristics that can be seen in a magnified image. However, positioning the camera such that the camera is touching the handbag is not necessary. This allows for a more efficient process of acquiring pictures. The efficient process could be leveraged, for example, by creating a factory line authentication process wherein multiple handbags can be consecutively authenticated using an assembly line model.

The step of sending the or more pictures to a network asset configured to execute a counterfeit-classifier model (420) is generally executed next. It is preferable to include, either before or with the one or more pictures, a brand and style which can be inputted by an operator of the portable electronic device. Including the brand and style has several purposes, including verifying that said brand and style has been trained in the counterfeit-classifier model. If the counterfeit-classifier model has not been trained on the brand and style, the operator of the portable electronic device can be notified. Another purpose of including the brand and style prior to or with the one or more pictures relates to when there is a plurality of counterfeit-classifier models each trained on a separate fabric. The brand and style can be used to send the one or more pictures to an appropriate model from the plurality of counterfeit-classifier models.

After the one or more pictures are sent, the step of comparing at least a portion of each of the one or more pictures with a plurality of stored images (430) follows. More specifically, the one or more images are processed through a bilinear CNN and subsequent classifier, said subsequent classifier is trained from the plurality of stored images. Training the classifier with the plurality of the stored images includes extracting features from the plurality of stored images. The features from the plurality of stored images are ultimately compared with features extracted from the one or more pictures.

The final step of the method authenticating a handbag comprises the step of determining if the handbag is a counterfeit based on said comparing (440). A threshold of a softmax output can be deliberately chosen to catch all counterfeit handbags while misclassifying a small portion of authentic handbags. If a counterfeit classification is charactered as a positive, then it can be appreciated by one having skill in the art that the threshold of the softmax output maximizes recall while making a sacrifice in precision. This is preferred due to an importance of catching counterfeits.

If a plurality of pictures is sent to a counterfeit-classifier model, it is possible, though unlikely, that some of the plurality of pictures may be predicted as authentic while others will be predicted as counterfeit, despite the plurality of pictures comprising a common handbag. Procedures such as a majority vote can be employed to determine a final predicted classification. A percentage needed to generate the final predicted classification can be customized wherein an amount lower than the percentage would return a counterfeit classification or no classification at all.

Figure 6:
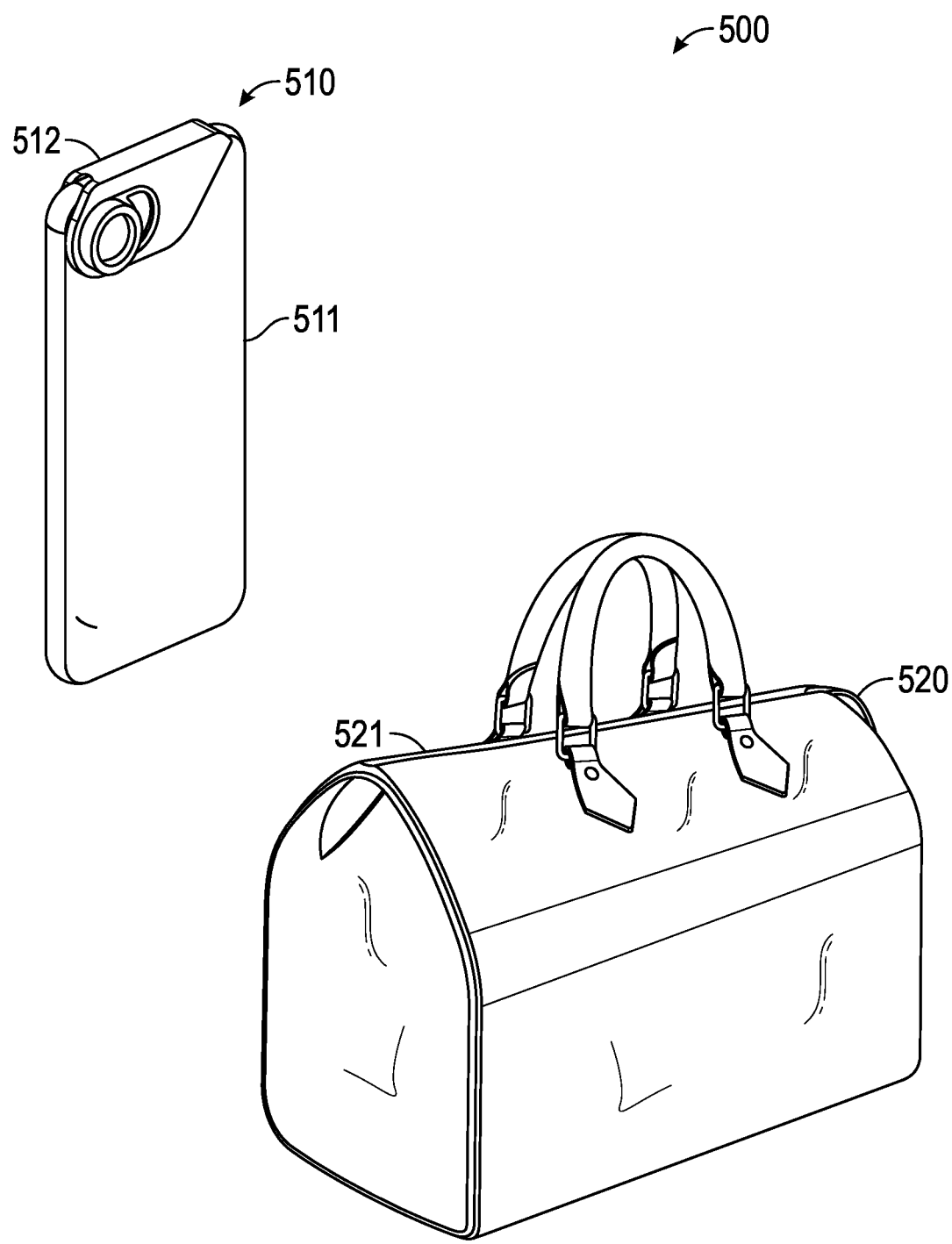
FIG. 6 is a representation of a portable electronic device and handbag.

Referring to FIG. 6, a representation of a portable electronic device and handbag (500) is shown. The representation comprises a portable electronic device (510) and a handbag (520). The portable electronic device includes a lens-accessory (512), wherein the lens-accessory and the portable electronic device, when used together, is capable of acquiring pictures having a magnification between 10× and 50×. The portable electronic device is capable of acquiring one or more photos of the handbag while being spaced apart therewith. The handbag comprises a fabric (521) which includes features that can make the handbag distinctive from other handbags.

Referring to FIG. 7, a table of data before performing data augmentation is shown. The table of data before data augmentation demonstrates a problem of class imbalance between authentic images and counterfeit images. For example, Louis Vuitton having the Monogram fabric comprises 8021 authentic images and only 2008 counterfeit. To correct the class imbalance, a method, such as described in FIG. 4, may be used to create more counterfeit images through perturbation.

Referring to FIG. 8, a table of data after performing data augmentation is shown. This table shows the quantities of both authentic images and counterfeit images. Number of authentic images remains the same, and number of counterfeit images have been increased via data augmentation to match the number of authentic images. It is not necessary that the number of counterfeit images must match the number of authentic images, and one having skill in the art will appreciate that a different number of counterfeit images can still solve class imbalance problems.

Referring to FIG. 9, a table of accuracy results is shown. The table exhibits testing results from three different fabrics, namely Monogram, DamierEbene, and Caviar. A model trained with training data of the Monogram fabric was tested with 562 authentic images and 242 counterfeit images, producing a 98% and 100% accuracy respectively. Similar results are also shown for the DamierEbene and Caviar. Increasing or decreasing false negatives and false positives can be achieved by modifying a threshold of a softmax output. It will be appreciated by one having skill in the art that to decrease false negatives or false positives will likely increase the other.

What is claimed is:

1. A method of authenticating a handbag comprising:
   receiving a picture of the handbag having a plurality of authentic-identifying features;
   receiving one or more characteristics of the handbag;
   determining a fabric associated with the handbag based on the one or more characteristics;
   selecting from among a plurality of counterfeit-classifier models each trained on one type of fabric, a counterfeit-classifier model trained on the fabric associated with the handbag;
   processing the picture through the counterfeit-classifier model trained on the fabric associated with the handbag; and
   determining authentication of said handbag.

2. The method of claim 1, wherein the one or more characteristics comprise brand, style, the fabric, or a combination thereof.

3. The method of claim 1, wherein the counterfeit-classifier model comprises a bilinear convolutional neural network (CNN) model trained from plurality of images.

4. The method of claim 1, wherein the processing the picture through the counterfeit-classifier model trained on the fabric associated with the handbag comprises:
   generating a first output from a first feature extracted from a first feature extractor;
   generating a second output from a second feature extracted from a second feature extractor; and
   multiplying the first and second outputs by an outer product.

5. The method of claim 1, wherein the processing the picture through the counterfeit-classifier model trained on the fabric associated with handbag comprises:
   extracting the plurality of authentic-identifying features of the pictures;
   comparing the plurality of authentic-identifying features of the picture with a plurality of authentic-identifying features associated with the counterfeit-classifier model.

6. A system for authenticating a handbag comprising:
   a processor and a non-transitory computer-readable medium, the non-transitory computer-readable medium of the electronic device being configured to store instructions, the instructions when executed by the processor cause the processor to perform steps comprising:
   receiving a picture of the handbag having a plurality of authentic-identifying features;
   receiving one or more characteristics of the handbag;
   determining a fabric associated with the handbag based on the one or more characteristics;
   selecting from among a plurality of counterfeit-classifier models each trained on one type of fabric, a counterfeit-classifier model trained on the fabric associated with the handbag;
   processing the picture through the counterfeit-classifier model trained on the fabric associated with the handbag; and
   determining authentication of said handbag.

7. The system of claim 6, wherein the one or more characteristics comprise brand, style, the fabric, or a combination thereof.

8. The system of claim 6, wherein the counterfeit-classifier model comprises a bilinear convolutional neural network (CNN) model trained from plurality of images.

9. The system of claim 6, wherein the processing the picture through the counterfeit-classifier model trained on the fabric associated with the handbag comprises:
   generating a first output from a first feature extracted from a first feature extractor;
   generating a second output from a second feature extracted from a second feature extractor; and
   multiplying the first and second outputs by an outer product.

10. The system of claim 6, wherein the processing the picture through the counterfeit-classifier model trained on the fabric associated with handbag comprises: extracting the plurality of authentic-identifying features of the pictures; comparing the plurality of authentic-identifying features of the picture with a plurality of authentic-identifying features associated with the counterfeit-classifier model.

11. A non-transitory computer-readable medium configured to store instructions, the instructions when executed by one or more computers, cause the one or more computers to perform operations comprising:
    receiving a picture of a handbag having a plurality of authentic-identifying features;
    receiving one or more characteristics of the handbag;
    determining a fabric associated with the handbag based on the one or more characteristics;
    selecting from among a plurality of counterfeit-classifier models each trained on one type of fabric, a counterfeit-classifier model trained on the fabric associated with the handbag;
    processing the picture through the counterfeit-classifier model trained on the fabric associated with the handbag; and
    determining authentication of said handbag.

12. The non-transitory computer-readable medium of claim 11, wherein the one or more characteristics comprise brand, style, the fabric, or a combination thereof.

13. The non-transitory computer-readable medium of claim 11, wherein the counterfeit-classifier model comprises a bilinear convolutional neural network (CNN) model trained from plurality of images.

14. The non-transitory computer-readable medium of claim 11, wherein the processing the picture through the counterfeit-classifier model trained on the fabric associated with the handbag comprises:
   generating a first output from a first feature extracted from a first feature extractor;
   generating a second output from a second feature extracted from a second feature extractor; and
   multiplying the first and second outputs by an outer product.

15. The non-transitory computer-readable medium of claim 11, wherein the processing the picture through the counterfeit-classifier model trained on the fabric associated with handbag comprises:
   extracting the plurality of authentic-identifying features of the pictures;
   comparing the plurality of authentic-identifying features of the picture with a plurality of authentic-identifying features associated with the counterfeit-classifier model.

* * * * *